United States Patent [19]

Wise et al.

[11] Patent Number: 5,484,643
[45] Date of Patent: Jan. 16, 1996

[54] SPACE FILLING UNIT AND METHOD OF USE THEREFOR

[76] Inventors: Frederick M. Wise, P.O. Box 849, Arvada, Colo. 80001; Ray Sainz, 3224 Bryant St., Denver, Colo. 80211; Carl F. DeWitt, 9340 Raleigh Ct., Westminster, Colo. 80030

[21] Appl. No.: 233,117

[22] Filed: Apr. 26, 1994

Related U.S. Application Data

[63] Continuation-in-part of Ser. No. 118,990, Sep. 9, 1993, Pat. No. 5,418,038.

[51] Int. Cl.$^6$ .................................................... B32B 9/00
[52] U.S. Cl. .......................... 428/192; 428/12; 428/47; 428/58; 428/59; 428/124; 428/126; 410/43; 410/52; 410/77; 410/106
[58] Field of Search ............................. 428/192, 59, 47, 428/58, 66, 95, 121, 120, 126, 124; 410/43, 106, 69, 77, 52, 150

[56] References Cited

U.S. PATENT DOCUMENTS

| | | | |
|---|---|---|---|
| 3,421,451 | 1/1969 | Brucks | 105/369 |
| 3,464,367 | 9/1969 | Latter | 105/369 |
| 3,534,691 | 10/1970 | Carlomagno, Jr. | 105/369 |
| 3,593,671 | 10/1970 | Bramlett | 105/369 B |
| 3,854,426 | 12/1974 | Kinnune, Jr. | 105/486 |
| 4,109,587 | 8/1978 | Jansen, Jr. | 105/490 |
| 4,363,579 | 12/1982 | Rogers | 410/154 |
| 4,372,717 | 2/1983 | Sewell | 410/154 |
| 4,494,897 | 1/1985 | Rogers | 410/154 |
| 5,132,156 | 7/1992 | Trassare, Jr. et al. | 428/116 |

*Primary Examiner*—Patrick J. Ryan
*Assistant Examiner*—Abraham Bahta
*Attorney, Agent, or Firm*—Timothy J. Martin

[57] ABSTRACT

A space filling unit for use in a container for cargo shipment to prohibit shifting of the cargo is formed by flat first and second panels, with first and second slots formed in each so that, when assembled, an x-shaped structure is formed. When placed in the container, respective end edges of the panels are supported on the bed of the cargo container while the other of the panel's end edges engage the container's sidewalls. The panel side edges form a pair of x-shaped bases which serve to support the cargo against movement toward the end wall of the container. An anti-slip element may be included on the respective end edges, braces may engage the panels proximate respective end edges, and panel wear on the cargo. An auxiliary bearing penal may also be used adjacent at least one of the x-shaped bases. A plurality of x-shaped structures may be utilized in the present invention, with a corresponding plurality of bearing panels interposed between the x-shaped structures.

25 Claims, 7 Drawing Sheets

SPACE FILLING UNIT AND METHOD OF USE THEREFOR

This is a continuation-in-part of my patent application Ser. No. 08/118,990 filed on Sep. 9, 1993, and entitled SPACE FILLING DEVICE, now U.S. Pat. No. 5,418,038.

FIELD OF INVENTION

The present invention generally relates to a device employed to inhibit movement of cargo disposed within a container which is being transported. More particularly, the present invention is directed to a space filling unit which occupies empty cargo space found among cargo items and between cargo and the upright support walls of the cargo container so as to inhibit movement of cargo while the cargo container is being transported. The present invention is specifically suitable to occupy empty cargo space in semi-trailers to inhibit movement of cargo therein while the semi-trailer is being transported by a truck.

BACKGROUND OF THE INVENTION

Ever since the invention of the wheel, human beings have transported goods by a vehicle from one location to another. Today, goods are transported by trucks, trains, airplanes and boats as cargo for delivery to virtually any location throughout the world. Particularly for commercial purposes, cargo is usually first loaded into a cargo container before being transported. A typical cargo container associated with trucks is a semi-trailer; a typical cargo container associated with trains is a boxcar; and, a typical cargo container associated with airplanes and boats is a "hold". For a variety of reasons, it is important to stabilize the cargo within the cargo container while it is being transported. During transportation, various movements of the transporting vehicle, such as stops, starts and turns, can cause the cargo within the cargo container to move. Movement of cargo within the cargo container poses several problems. First, two cargo items can collide thereby causing damage thereto. Second, movement of the cargo within the cargo container can damage the cargo container which could potentially render it unusable for further service. Third, moving cargo within the cargo container causes the center of gravity of the cargo container to shift. A significant shift of the center of gravity of the cargo container results in a perilous situation for the driver of the vehicle. For example, a turning vehicle with a significant shift of its center of gravity can rollover causing death and injury to the driver and pedestrians as well as damage to the cargo.

To resolve these problems, various means and devices have been developed to restrain the cargo within the cargo container as it is being transported. One means of restraint requires that the cargo be secured to the upright support walls of the cargo container. Usually, the upright support walls of the container are provided with fixtures so that ropes or straps can be releasably affixed thereto to restrain the cargo to the upright support walls. Although restraining the cargo against the upright support walls of the container can be effective, the shifting forces that continue to act upon the cargo can cause the ropes or straps to break which in turn, results in unrestrained movement of the cargo within the cargo container.

Another means of eliminating movement of cargo is to strategically place each cargo item onto the floor of the cargo container in a manner to eliminate any empty cargo space therebout. Now, as shifting forces act upon the cargo, the cargo is unable to move because the upright support walls of the cargo container and the sides of the cargo interact to restrain any movement of the strategically placed cargo items. For less-than-truckload amounts of cargo, this means is useless. Furthermore, eliminating any empty cargo space is not often conducive to efficient multiple deliveries of portions of the cargo.

Even with a sufficient amount of cargo being delivered to a single destination, it is not always possible to eliminate all empty cargo space due to the type of cargo being transported. To resolve this problem, space filling devices such as empty boxes or blankets can be used to fill the empty cargo space. However, if the cargo is sufficiently heavy, empty boxes can potentially be crushed when the cargo moves, thereby rendering the empty boxes useless for cargo restraint. Furthermore, a significant amount of empty cargo space to be filled makes empty boxes and blankets impractical for use.

Specific types of cargo pose even more challenging problems. For example, packaged beverage cans are extremely heavy and are typically loaded over the axles of a semi-trailer in order to evenly distribute the heavy weight appropriately thereabout. This loading arrangement often creates empty cargo space not only between the cargo and the upright support walls of the cargo container but also between cargo items. To maximize the load carrying capacity of the truck, usually the packaged beverage cans are stacked one on top of another within the cargo container close to the ceiling. Now, the shifting forces which are incurred during transportation can not only move the packaged beverage cans about the floor of the cargo container but also tip the upper packaged beverage cans over and into the empty cargo space. To eliminate this problem, a space filling structure is employed inside the cargo container. This space filling structure includes metal bars and rails which support sheets of plywood which, in turn, secure the cargo against moving and tipping. Although this space filling structure does effectively restrain the cargo, it is attendant with disadvantages. Such a space filling structure is permanent as it requires metal bars to be welded to the inside walls of the semi-trailer. Some commercial trucking companies refuse to make permanent modifications to the semi-trailers. Additionally, materials to construct this space filling structure and labor to install it are quite costly. Furthermore, this space filling structure is heavy and the weight added thereby reduces the cargo weight which can be hauled.

A need remains in the industry to provide a space-filling structure which is sufficiently versatile to fit into any size of empty cargo space between cargo items or between the cargo and the upright support walls of the cargo container. It would be advantageous if such a space filling structure can be folded or disassembled for compactness in order to stow it when not in use. It would also be advantageous if the space filling structure is lightweight and provides a high compressive strength to absorb and dissipate the compressive forces produced by the cargo. A need also exists to provide a portable space filling structure which not only prohibits movement of the cargo but also prevents tipping of the cargo. It would also be advantageous if the space filling structure can occupy significant volume in its working state but can occupy a minimum of volume in its stow state. The present invention addresses these needs and these advantages.

SUMMARY OF INVENTION

It is an object of the present invention to provide a new and useful space filling unit which can be interposed either between cargo items or cargo and the upright support walls of a cargo container to inhibit movement of the cargo towards the upright support wall when transporting the cargo container.

Another object of the present invention is to provide a space filling unit which is sufficiently versatile so that it can fit into various sizes of empty cargo space between cargo items or between the cargo and the upright support walls of the cargo container.

Yet another object of the present invention is to provide a space filling unit which, when employed between cargo items or between cargo and the upright support walls of the container, inhibits movement and tipping of the cargo.

Still another object of the present invention is to provide a space filling unit which can occupy a significant amount of empty cargo space when in its working state and a minimum amount of volume when in its stow state.

A still further object of the present invention is to provide a space filling unit of simple construction which can be easily folded or disassembled for compactness during storage.

Yet another object of the present invention is to provide an inexpensive space filling unit which is lightweight and portable.

Yet another object of the present invention is to provide a space filling unit which can distribute compressive forces imposed upon it by the cargo.

Still another object of the present invention is to provide a space filling unit which has a high compressive strength to withstand the compressive forces imposed upon it by the cargo.

A still further object of the present invention is to provide a space filling unit to be used for packing cargo whereby cargo is placed on the floor of the cargo container at a desired location and empty cargo space is then filled by the space filling units.

Accordingly, a space filling unit, a space filling system, a space filling structure and a method of packing cargo are hereinafter described. The space filling unit is adapted to be interposed between an upright support wall of a cargo container and cargo. The cargo container has a floor and cargo placed on the floor in the cargo container to inhibit movement of the cargo toward the upright support wall when transporting the cargo container. The space filling unit includes a first panel member and a second panel member connected to the first panel member along a longitudinally extending vertex. Each of the first and second panel members has a base edge disposed opposite the vertex which is sized and adapted to be positioned on and supported by the floor of the cargo container. The first panel member has oppositely-disposed parallel first side edges and the second panel has oppositely-disposed parallel second side edges. Associated ones of the first side edges and the second side edges form a first end a second end which are operative to abut respective ones of the upright support wall and the cargo to inhibit movement of the cargo towards the upright support wall when transporting the cargo container.

The first and second panel members are hingedly connected to each other along the vertex so that the first and second panel members can move relative to each other to form an inverted V-shaped structure. Alternatively, a plurality of first panel members and a plurality of second panel members can be hingedly interconnected together to from an accordion-shaped structure. It is preferred that the first and second panel members are formed of a unitary construction and scored across a width to define a hinge. Alteratively, each of the first and second panel members extends beyond the vertex and terminates in an upper edge oriented parallel to the base edges to form an X-shaped structure. Herein, the upper edges are sized and adapted to be positioned on and supported by a pair of upright opposing sidewalls extending perpendicularly from the upper support wall of the container. The space filling unit preferably has a unit height in a range of 50% and 90% of a cargo height of the cargo abutting the space filling unit.

For the X-shape structure, each of the first and second panel members includes a slot. Each slot extends from one of the side edges of the first and second panel members toward the opposite edge. Each slot is operative to receive each other so that the first and second panel members can releasably engage to form the X-shaped structure. It is preferred that each of the slots are located medially between the base edge and the upper edge of respective ones of the first and second panel members. Preferably, the first and second panel members are fabricated from a cardboard material. It is preferred that the cardboard material has a plurality of corrugations extending parallel with the vertex and that the first and second panel members are of substantially common size and shape.

A space filling system is adapted to be used when shipping cargo. In its broadest form, the space filling system includes a cargo transport structure and a space filling unit as described above. The cargo transport structure includes a cargo container operative to receive cargo. The cargo container has a floor and a plurality of upright support walls extending from the floor to define a cargo space so that the cargo can be placed on the floor in the cargo container. The space filling unit is operative to be interposed between the cargo and a select one of the upright support walls of the cargo container to inhibit movement of the cargo towards the select upright support wall when transporting the cargo transport structure.

Alternatively, the space-filing system includes a cargo transport structure and a plurality of space filling units. Each space filling unit is operative to be interposed between one of adjacent ones of cargo items and a select one of the upright support walls and a select one of the cargo items to inhibit movement of the cargo items towards the select upright support wall when transporting the cargo transport structure.

A space filling structure can include at least one auxiliary panel and a plurality of space filling units. The auxiliary panel has a first auxiliary panel surface and an opposite second auxiliary panel surface extending parallel to the first auxiliary panel surface. The base edge of each of the first and second panel members is sized and adapted to be positioned on and supported by either the floor of the cargo container or the auxiliary panel. When the plurality of space filling units are stacked upon one another, at least one auxiliary panel is disposed in a horizontal plane therebetween. It is preferred that the auxiliary panel has a first auxiliary panel end and a second auxiliary panel end extending parallel to the first auxiliary panel end. The first and second auxiliary panel ends are spaced apart from each other so that the first and second panel ends are operative to abut respective ones of the upright support wall of the cargo container and the cargo to inhibit movement of the cargo towards the upright support wall when transporting the cargo container. Alternatively, the auxiliary panel is operative to be disposed in a vertical plane between two space filling units positioned in an end-to-end arrangement. With this arrangement, the first ends of each space filling unit abut respective first and second auxiliary panel surfaces and second ends of each space filling unit abut respective ones of the upright support wall and the cargo to inhibit movement of the cargo towards the upright support wall when transporting the cargo container. With the auxiliary panel disposed in the vertical plane, one of the first and second auxiliary panel ends is operative to abut the floor of the container.

Also described herein is a method of packing cargo in a cargo container having a plurality of upright support walls extending from a floor to define a cargo space. The first step of the method includes placing the cargo on the floor of the container in a desired location. The second step includes filling first empty cargo space located between cargo and the upright support walls of the container with at least one space filling unit. The method of packing cargo in a container may also include filling second empty cargo space located between and interspersed among the cargo with at least one space filling unit. The first and second ends of each of the space filling units filling second empty cargo space located between and interspersed among the cargo are operative to abut adjacent ones of the cargo thereby retaining the space filling units and the cargo in a stationary position when transporting the cargo container.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

A space filling unit of the present invention is employed with a cargo container to inhibit movement of cargo while transporting the cargo container. The space filling unit is interposed either between an upright support wall of the cargo container and a cargo item or between adjacent cargo items. A skilled artisan will appreciate that the space filling unit of the present invention can be constructed in a variety of sizes. Depending upon size, the space filling unit and an auxiliary panel can be employed to provide a space filling structure. With the auxiliary panel, space filling units of various sizes can be either stacked on top of one another with the auxiliary panel or auxiliary panels disposed in a horizontal plane therebetween or can be arranged in an end-to-end relationship with the auxiliary panel or auxiliary panels disposed in a vertical plane therebetween. Furthermore, the space filling unit and a cargo transport structure provide a space filling system.

Figure 1:
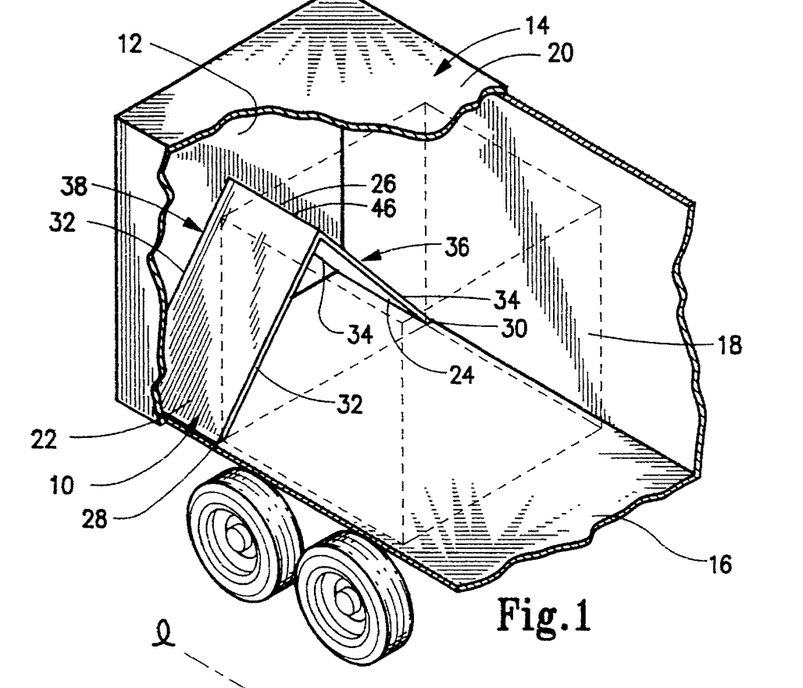
FIG. 1 is a perspective view of a cargo container in the form of a semi-trailer, partially broken away, employing a first embodiment of a space filling unit of the present invention.
Figure 2:
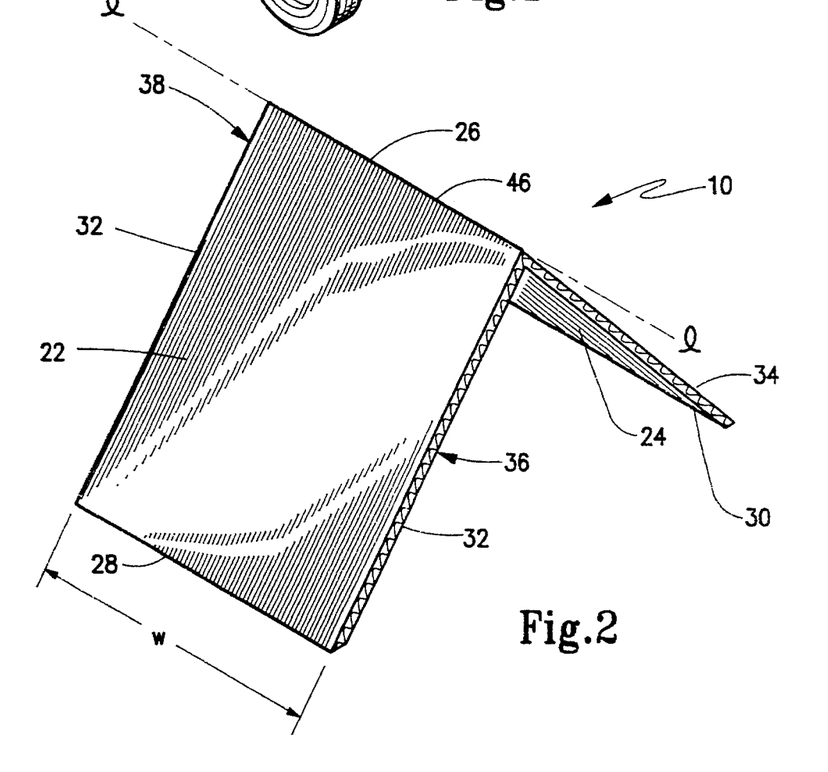
FIG. 2 is an enlarged perspective view of the space filling unit of the present invention shown in FIG. 1.
Figure 3:
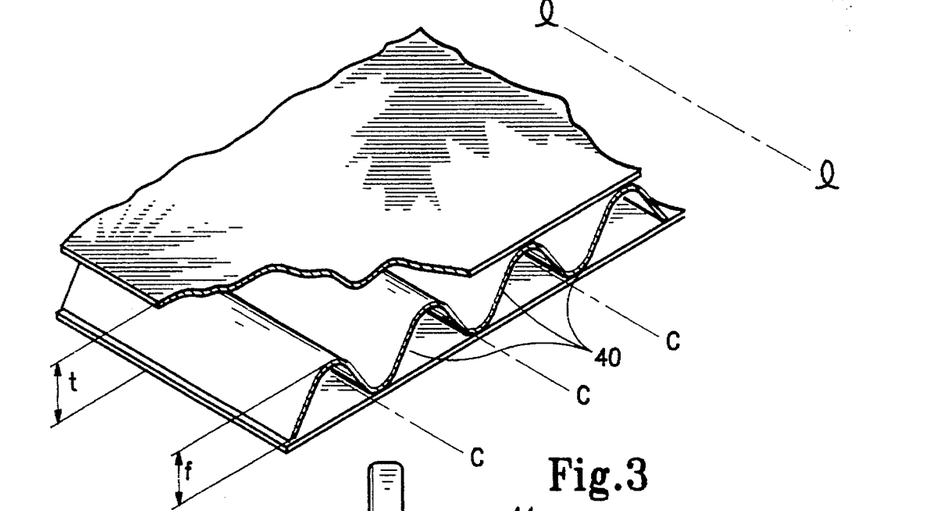
FIG. 3 is a fragmentary perspective view, partially broken away, of a tri-wall cardboard material used to fabricate the space filing unit of the present invention.
Figure 4:
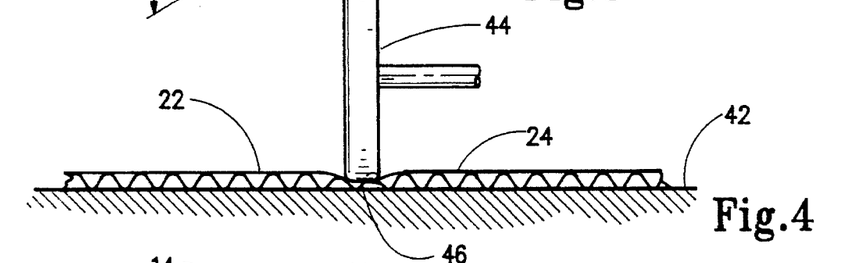
FIG. 4 is a side view in elevation of the tri-wall cardboard material of FIG. 3 being scored.
Figure 5:
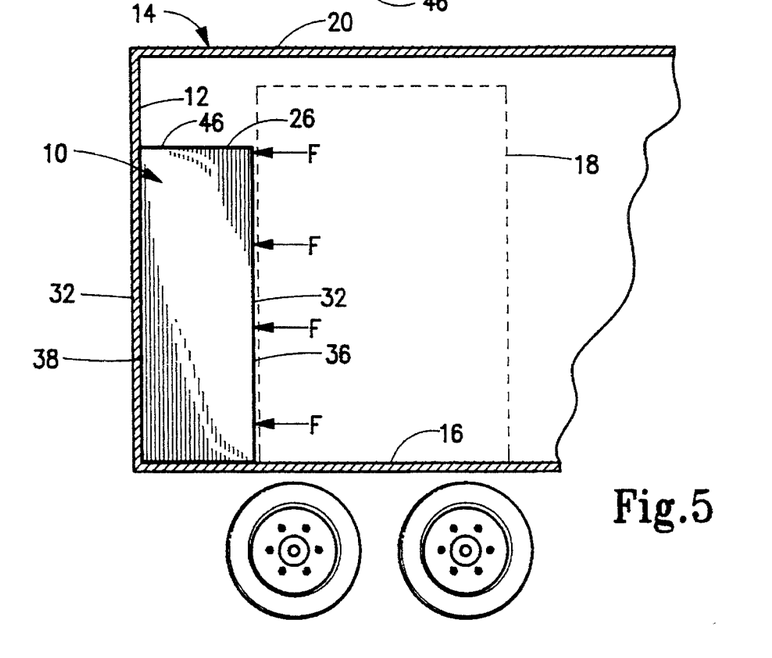
FIG. 5 is a side view in elevation of the space filling unit of the present invention of FIG. 1 absorbing compressive forces of cargo abutted thereagainst.
Figures 6, 7, 8:
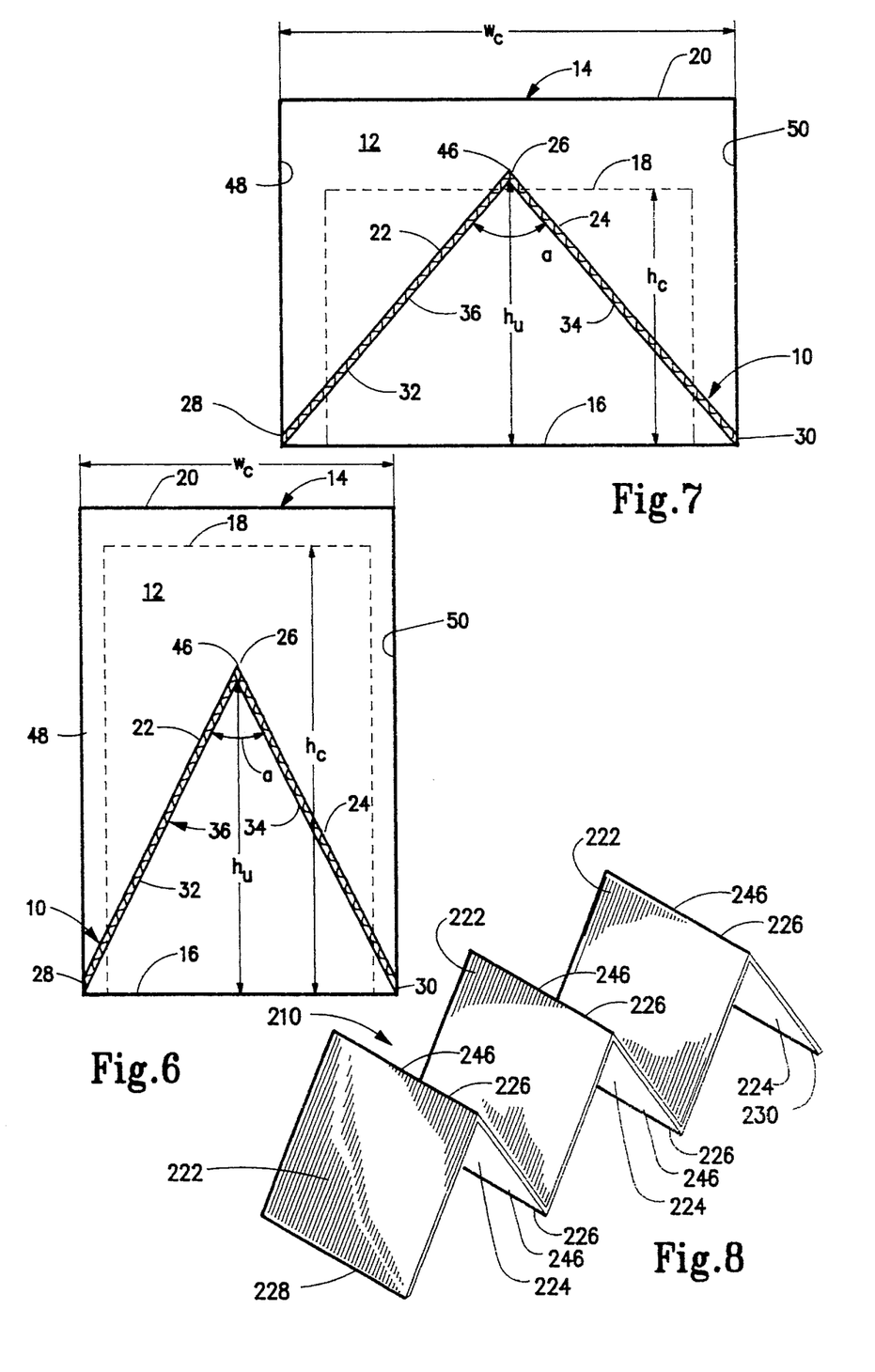
FIG. 6 is a front view in elevation of the space filling unit of the present invention disposed in the cargo container and abutting cargo, drawn in phantom, as shown in FIG. 5.
FIG. 7 is a front view in elevation of the space filling unit of the present invention disposed in the cargo container and abutting cargo, drawn in phantom, as shown in FIG. 5.
FIG. 8 is a perspective view of a second exemplary embodiment of a space filling unit of the present invention.

As generally introduced in FIGS. 1–7, a first exemplary embodiment of a space filling unit 10 of the present invention is illustrated. Space filling unit 10 is adapted to be interposed between an upright support wall 12 of a cargo container 14 that has a floor 16 and cargo 18, drawn in phantom, placed on floor 16 in the cargo container 14 to inhibit movement of cargo 18 toward upright support wall 12 when transporting cargo container 14. By way of example only, cargo container 14 is in the form of a semi-trailer 20. Space filling unit 10 includes a first panel member 22 and a second panel member 24 connected to first panel member 22 along a longitudinally extending vertex 26. Each of first and second panel members 22 and 24 has a base edge 28 and 30 respectively which are disposed opposite vertex 26. Base edges 28 and 30 are sized and adapted to be positioned on and supported by floor 16 of cargo container 14. First panel member 22 has oppositely-disposed parallel first side edges 32 and second panel member 24 has oppositely-disposed parallel second side edges 34 as best shown in FIGS. 1, 6 and 7. Associated ones of first side edges 32 and second side edges 34 of each first and second panel members 22 and 24 form a first end 36 and a second end 38 respectively which are operative to abut respective ones of upright support wall 12 and cargo 18 to inhibit movement of cargo 18 towards upright support wall 12 when transporting cargo container 14. It is preferred that first and second panel members 22 and 24 are of substantially common size and shape. Although not by way of limitation, first and second side panel members 22 and 24 can be fabricated from materials such as cardboard, corrugated fiber board (also sometimes referred to as "cardboard"), plywood, plastic, corrugated plastic and honeycomb material. As shown in FIG. 3 and by way of example only, first and second side panel members are fabricated from a single-wall cardboard material having a thickness "t" which can typically be in a range of ⅛th of an inch and ¾ths of an inch. Also, board test of the cardboard material is preferred to be in a range of 275 pounds per square inch and 1,100 pounds per square inch. Additionally, it is preferred that the cardboard material has a plurality of corrugations 40 which extend along longitudinally extending lines "c" which extend parallel with longitudinal line "l" of vertex 26 as represented in FIG. 3. It is also preferred that flute "f" of corrugations 40 is A, B or C. Furthermore, one of ordinary skill in the art would appreciate that the cardboard material could also be double wall or tri-wall. Having corrugations 40 which extend parallel with vertex 26 adds compression-resistive strength to space filling unit 10.

It is preferred that first and second panel members 22 and 24 are hingedly connected to each other along vertex 26 so that first and second panel members 22 and 24 can move relative to each other to form an inverted V-shaped structure as shown in FIGS. 1, 2, 6 and 7. It is also preferred that first and second panel members 22 and 24 are formed of a unitary construction. With reference to FIG. 4, first and second panel members 22 and 24 of the unitary construction are being compressed against a support surface 42 with a conventional scoring mechanism 44. First and second panel members 22 and 24 of unitary construction are scored across a width "w" (as best shown in FIG. 2) to define a hinge 46 so that first and second panel members 22 and 24 of unitary construction can pivot thereabout.

In FIGS. 5–7, space filling unit 10 is shown in its working state whereby space filling unit 10 is interposed between upright support wall 12 of cargo container 14 and cargo 18. In FIG. 5, compressive forces "F" are exerted by cargo 18 onto space filling unit 10 and distributed along first end 36 of space filing unit 10. By way of example only, compressive forces "F" can be generated by a truck towing cargo container 14 as the truck accelerates. Compressive forces "F" are absorbed by space filling unit 10 and distributed to upright support wall 12 along second end 38 thereby inhibiting movement of cargo 18 toward upright support wall 12 when transporting cargo container 14.

Although not by way of limitation, space filling unit 10 has an optimum working height "$h_u$" and an optimum working angle "a" when in its working state. It is preferred that working height "$h_u$" of space filling unit 10 is equal to 75% of a cargo height "$h_c$" as best shown in FIG. 6. However, as shown in FIG. 7, it is possible that working height "$h_u$" of space filling unit 10 is greater than cargo height "$h_c$" without impairing space filling unit 10 from inhibiting movement of cargo 18. As best shown in FIGS. 6 and 7, first and second panel members 22 and 24 pivot about hinge 46 to form a working angle "a". Although it is preferred that working angle "a" is equal to 45°, working angle "a" can be selected in a range of 20° and 90°. Although not by way of limitation, because first and second panel members 22 and 24 pivot about hinge 46, space filling unit 10 adapts to expand across varying cargo container widths "$w_c$" as shown in FIGS. 6 and 7. Thus, one of ordinary skill in the art would appreciate that base edges 28 and 30 can also be positioned on and supported by a pair of opposing sidewalls 48 and 50 extending perpendicularly from upright support wall 12. Additionally, since first and second panel members 22 and 24 pivot about hinge 46, space filling unit 10 can fold into a stow state whereby working angle "a" is zero, thus forming a folded, double-panel structure. If desired, space filling unit 10 can fold into an alternate stow state whereby angle "a" is 180°, thus forming an elongated single-panel structure.

Figure 9:
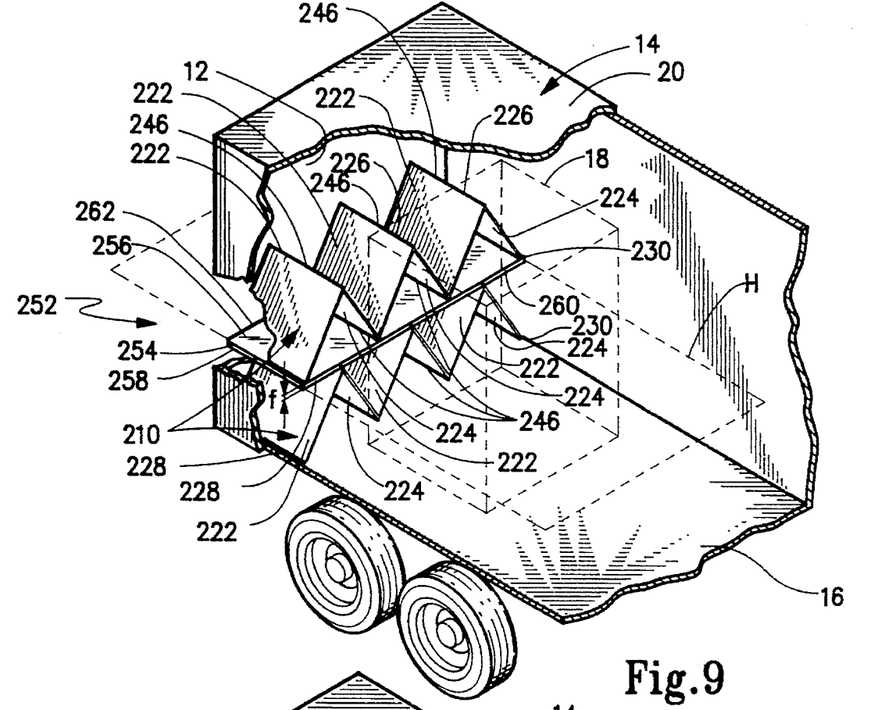
FIG. 9 is a perspective view of a cargo container in the form of a semi-trailer, partially broken away, employing a plurality of space filling units of the second exemplary embodiment of the present invention of FIG. 8 stacked on top of another with an auxiliary panel.

A second exemplary embodiment of a space filling unit 210 is shown in FIGS. 8 and 9. Space filling unit 210 includes a plurality of first panel members 222 and a plurality of second panel members 224 hingedly interconnected together along corresponding vertexes 226 to form an accordion-shaped structure by a plurality of hinges 246. Although not by way of limitation, space filling unit 210 is a component of a space filling structure 252. Space filling structure 252 includes at least one auxiliary panel 254 and a plurality of space filling units 210. Auxiliary panel 254 has a first auxiliary panel surface 256 and opposite second auxiliary panel surface 258 extending parallel to first auxiliary panel surface 256. One of each first and second panel members 222 and 224 have a base edge 228 and 230 respectfully disposed opposite vertex 226. Base edges 228 and 230 are sized and adapted to be positioned on and supported by either floor 16 of cargo container 14 or auxiliary panel 254. When the plurality of the space filling units 210 are stacked upon one another, as shown in FIG. 9, at least one auxiliary panel 254 is disposed in a horizontal plane "H" therebetween.

Auxiliary panel 254 has a first auxiliary panel end 260 and a second auxiliary panel end 262 which extends parallel to first auxiliary panel end 260. First and second auxiliary panel ends 260 and 262 are spaced apart from each other so that first and second auxiliary panel ends 260 and 262 are operative to abut respective ones of upright support wall 12 and cargo 18 to inhibit movement of cargo 18 towards upright support wall 12 when transporting cargo container 14. Although auxiliary panel 254 can also be fabricated from a material such as cardboard, corrugated fiber board, plywood, plastic and honeycomb material it is preferred that the auxiliary panel 254 be fabricated with the material from which space filling unit 210 is fabricated.

Figure 10:
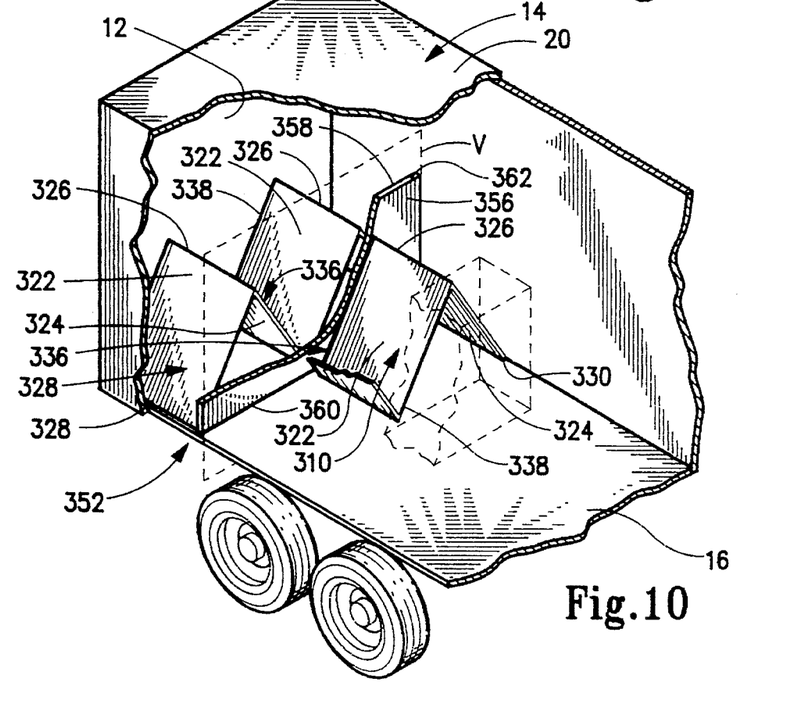
FIG. 10 is a perspective view of a cargo container in the form of a semi-trailer, partially broken away, showing a plurality of alternative space filling units of the second exemplary embodiment of the present invention arranged in an end-to-end relationship and separated by an auxiliary panel.

A third exemplary embodiment of a space filling unit 310 is shown in FIG. 10. One of ordinary skill in the art would appreciate that space filling unit 310 is similar to the accordion-shaped structure of space filling unit 210 described immediately hereinabove. The only difference is that space filling unit 310 has fewer first and second panel members 322 and 324. Space filling unit 310 is used for illustration purposes only to describe an alternative space filling structure 352. Herein, base edges 328 and 330 are disposed opposite vertexes 326 and are operative to be positioned on and supported by floor 16 of cargo container 14. An auxiliary panel 354, similar to auxiliary panel 254 described immediately hereinabove, is employed for use with space filling structure 352. Auxiliary panel 354 is operative to be disposed in a vertical plane "V" between two space filling units 310 that are positioned in an end-to-end relationship and interposed between respective ones of upright support wall 12 and cargo 18. First ends 336 of each space filling unit 310 abut respective first and second auxiliary panel surfaces 356 and 358 and second ends 338 of each space filling unit 310 abut respective ones of upright support wall 12 and cargo 18. Auxiliary support panel 354 has a first auxiliary panel end 260 and a second auxiliary panel end 362 which extends parallel to first auxiliary panel end 360. First and second auxiliary panel ends 360 and 362 are spaced apart from each other so that one of first and second panel ends 360 and 362 is operative to abut floor 16 of cargo container 14.

A fourth exemplary of a space filling unit 410 is generally introduced in FIGS. 11–17. Space filling unit 410 includes first and second panel members 422 and 424, each of which extends beyond vertex 426. First and second panel members 422 and 424 terminate respectively in upper edges 464 and 466 which are oriented parallel to base edges 428 and 430 to form an X-shaped structure. Upper edges 464 and 466 are sized and adapted to be positioned on and supported by the pair of upright opposing sidewalls 48 and 50 of cargo container 14.

Figures 11, 12, 13, 14:
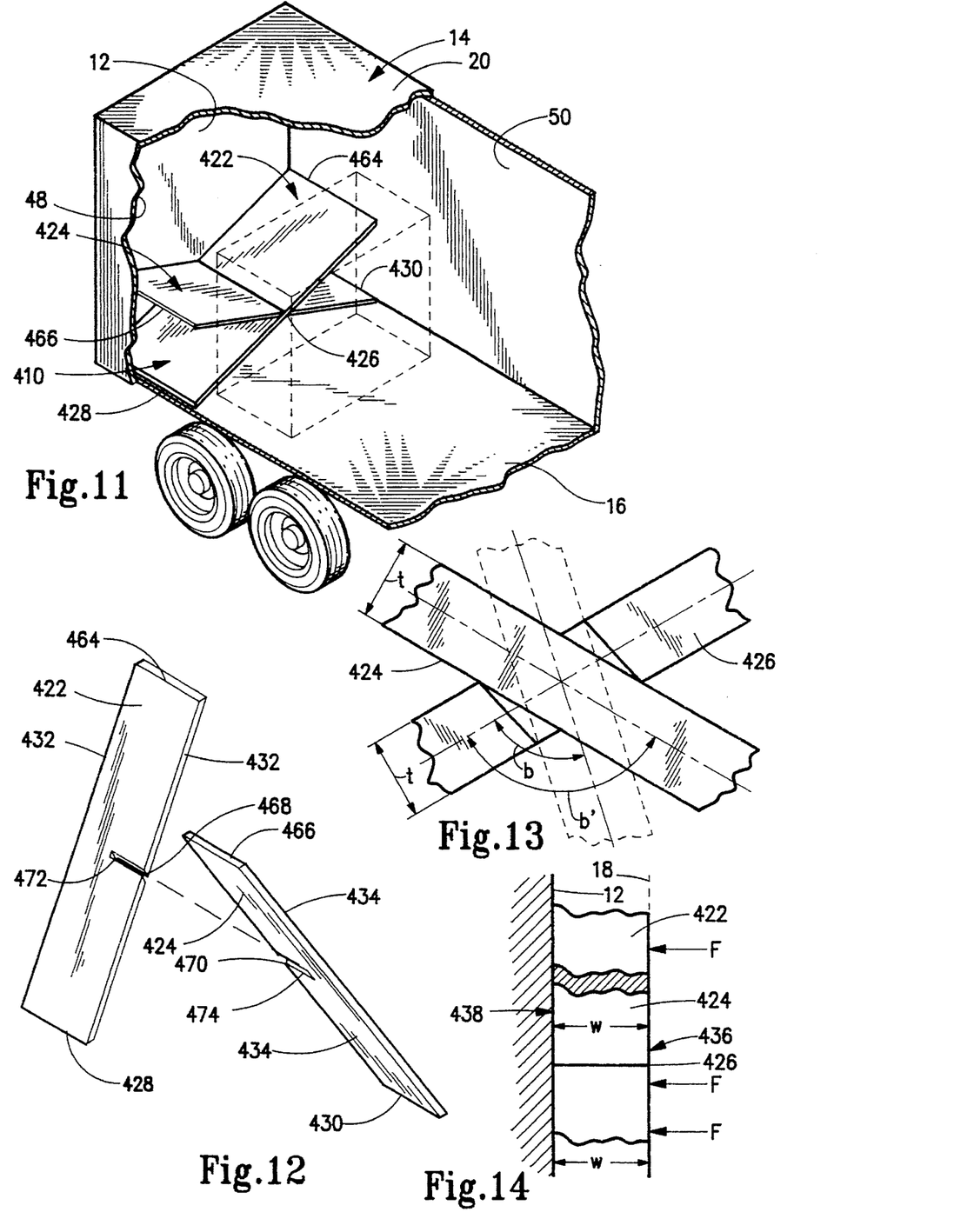
FIG. 11 is a perspective view of a cargo container in the form of a semi-trailer, partially broken away, employing a third exemplary embodiment of a space filling unit of the present invention.
FIG. 12 is an exploded perspective view of the third exemplary embodiment of a space filling unit of the present invention shown in FIG. 11 depicting a first panel member and a second panel member thereof with each having a slot located medially of the panel member.
FIG. 13 is a partial front view in elevation of the first and second panel members of the third exemplary embodiment of the space filling unit of the present invention matably engaged at corresponding slots.
FIG. 14 is a partial side view in elevation of the first and second panel members of FIG. 13 disposed between cargo and an upright support wall of the cargo container with the panel members absorbing compressive forces of the cargo.
Figures 15, 16, 17:
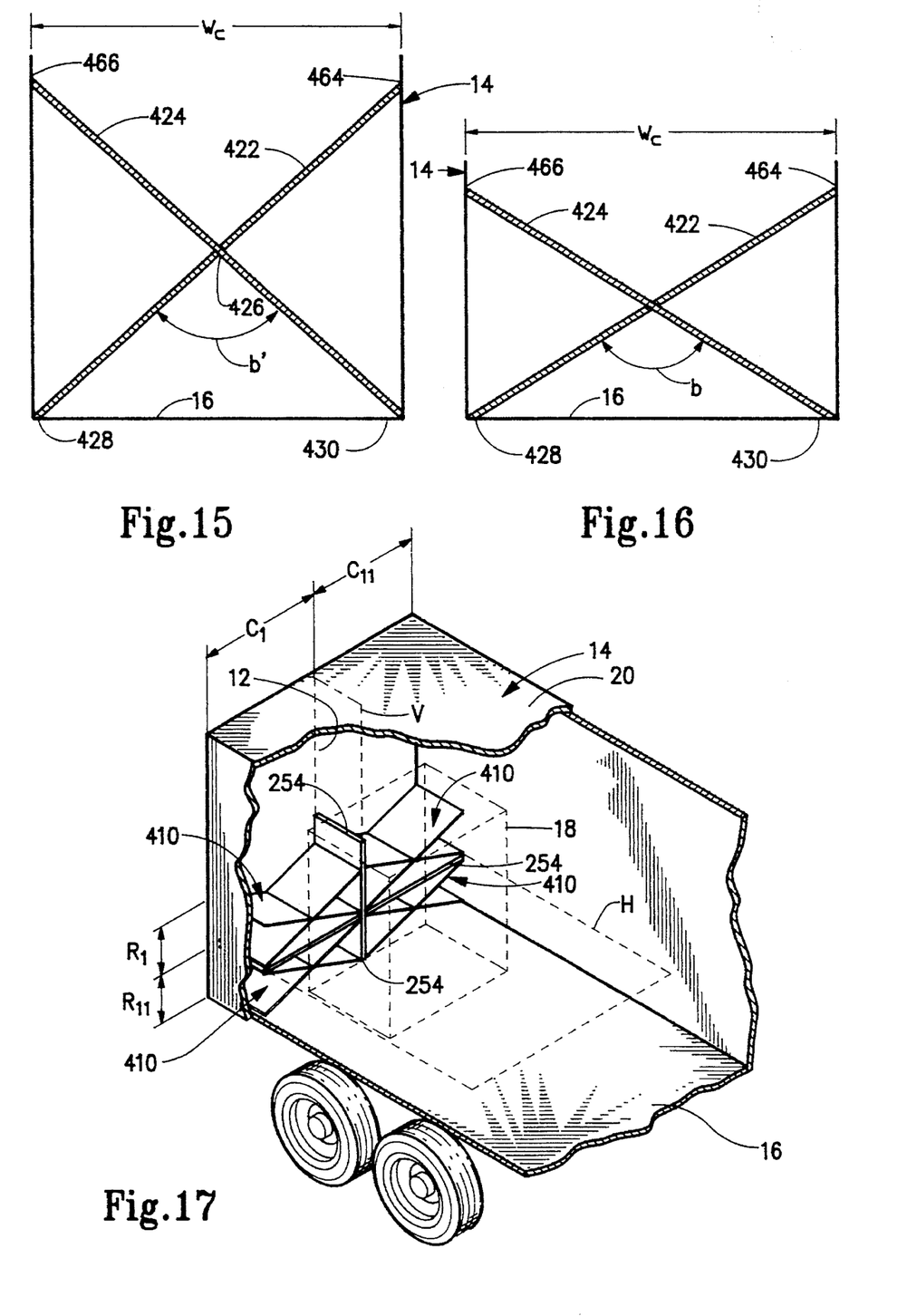
FIG. 15 is a front view in elevation of the third exemplary embodiment of the space filling unit of the present invention supported by a floor and two opposing sidewalls of the cargo container of FIG. 11.
FIG. 16 is a front view in elevation of the third exemplary embodiment of the present invention being supported by the floor and two opposing sidewalls of the cargo container of FIG. 11.
FIG. 17 is a perspective view of a cargo container in the form of a semi-trailer, partially broken away, employing a plurality of the third exemplary embodiments of the space filling units of the present invention of FIG. 11 with a plurality of auxiliary panels.

Each of first and second panel members 422 and 424 respectively include a slot 468 and 470. Slot 468 extends from one of first side edges 432 toward an opposite first side edge of first panel member 422. Slot 470 extends from one of second side edges 434 towards an opposite second side edge of second panel member 424. Slots 468 and 470 are operative to receive each other so that first and second panel members 422 and 424 can releasably engage with each other to form the X-shaped structure. Each respective slot 468 and 470 is located medially between respective base edges 428 and 430 and respective upper edges 464 and 466 of respective ones of the first and second panel members 422 and 424. Slots 468 and 470 are sized so that first and second panel members 422 and 424 can articulate relative to each other between a first working angle "b" and a second working angle "b'" as shown in FIG. 13. This feature is achieved merely by sizing either or both slots 468 and 470 somewhat greater than thickness "t". Also, this feature enables the X-shaped structure to accommodate varying cargo container widths "$w_c$" as shown in FIGS. 15 and 16. It is preferred that slots 468 and 470 are sized so that rear slot walls 472 and 474 abut when first panel member 422 and second panel member 424 are releasably engaged. It is also important that respective widths "w" of first and second panel members 422 and 424 are substantially equal as shown in FIG. 14 so that compressive forces "F" exerted by cargo 18 is distributed along first end 436 which in turn, can be transferred to upright support wall 12 along second ends 438. Separating first and second panel members 422 and 424, as shown in FIG. 12, disassembles the X-shaped structure thereby rendering it in its stow state.

In FIG. 17, a plurality of the fourth exemplary embodiments of space filling unit 410 of the present invention can be interposed between upright support wall 12 and cargo 18. Although the plurality of space filling units 410 are arranged in columns, $C_1$ through $C_N$, and rows, $R_1$ through $R_N$, one or ordinary skill in the art would appreciate that, by employing the appropriate number of auxiliary panels 254 in both the horizontal and vertical planes, any number of columns and rows of space filling units 410 can be constructed.

Figures 18A, 18B, 19A, 19B:
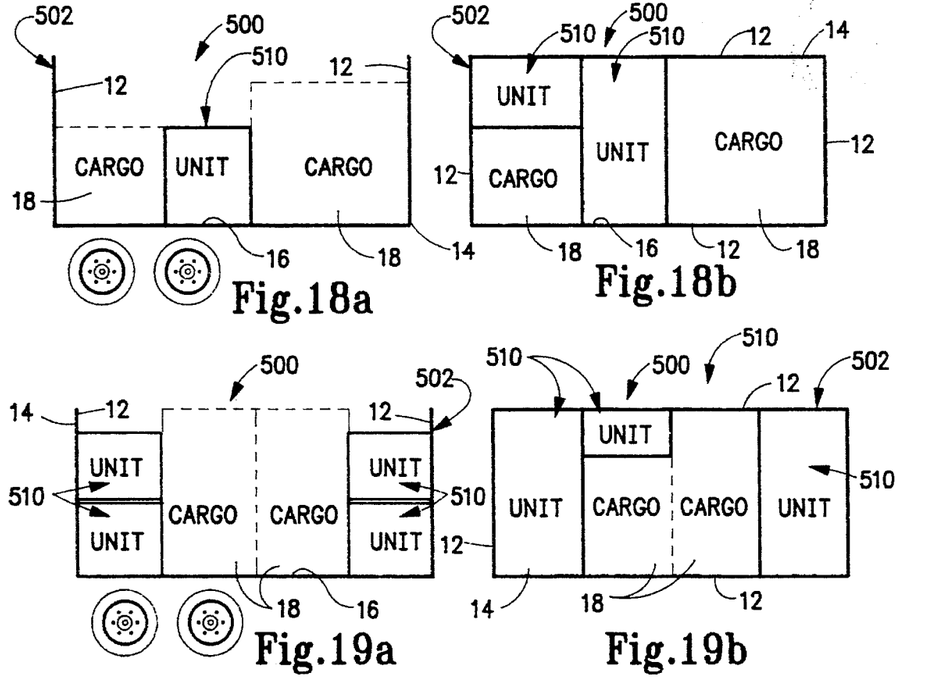
FIG. 18(a) is a diagrammatic view showing a side view arrangement of cargo and space filling units of the present invention within a cargo container in the form of a semi-trailer.
FIG. 18(b) is a diagrammatic view depicting a top view arrangement of cargo and space filling units of the present invention shown in FIG. 18(a)
FIG. 19(a) is a diagrammatic view depicting a side-view arrangement of cargo and space filling units of the present invention within a cargo container in the form of a semi-trailer.
FIG. 19(b) is a diagrammatic view depicting a top view arrangement of cargo and space filling units shown in FIG. 19(a)
Figure 20A:
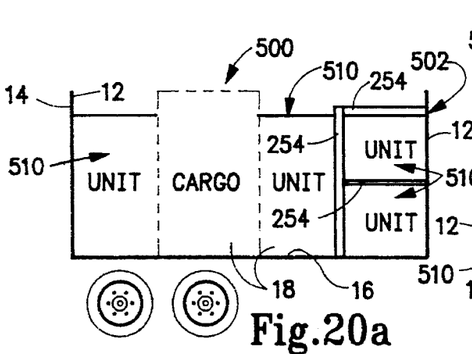
FIG. 20(a) is a diagrammatic view depicting a side-view arrangement of cargo and space filling units of the present invention within a cargo container in the form of a semi-trailer.
Figure 20B:
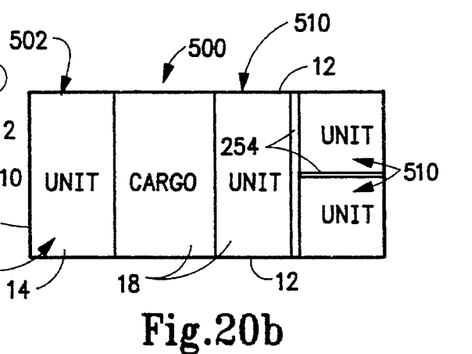
FIG. 20(b) is a diagrammatic depicting a side-view arrangement of cargo and space filling units of the present invention shown in Figure in FIG. 20(a)
Figures 21A, 21B:
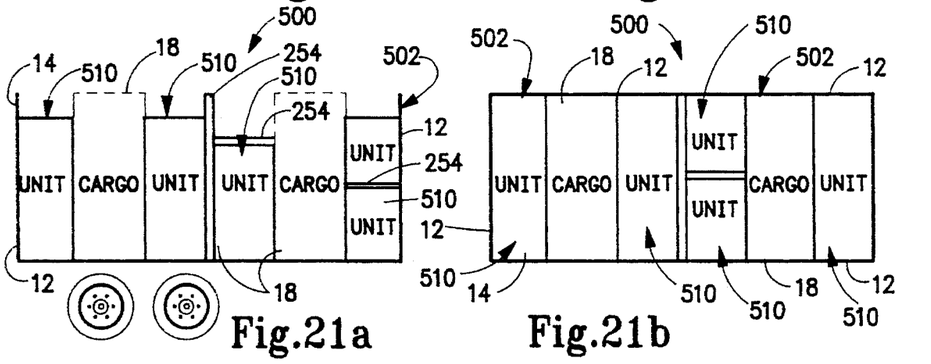
FIG. 21(a) is a diagrammatic view depicting a side-view arrangement of cargo and space filling units of the present invention within a cargo container in the form of a semi-trailer.
FIG. 21(b) is a diagrammatic view depicting a top-view arrangement of cargo and space filling units as shown in FIG. 21(a).

As shown in FIGS. 18(*a*) through FIGS. 21(*b*), a space filling system 500 which is adapted to be used in shipping cargo and a preferred method of packing cargo in a cargo container are generally introduced. Space filling system 500 includes a cargo transport structure 502 and a space filling unit 510 which can be any of the space filling units of the present invention described hereinabove. Cargo transport structure 502 includes a cargo container 14 which is operative to receive cargo 18. Cargo container 14 has a floor 16 and a plurality of upright support walls 12 extending from floor 16 to define a cargo space so that cargo 18 can be placed on floor 16 in cargo container 14. Space filling unit 510 is operative to be interposed between cargo 18 and a select one of upright support walls 12 of cargo container 14. Alternatively, space filling system 500 includes a cargo transport structure 502 and a plurality of space filling units 510. Cargo transport structure 502 includes cargo container 14 operative to receive a plurality of cargo items 18 which can be placed on floor 16 in cargo container 14. Each space filling unit 510 is operative to be interposed between either adjacent ones of cargo items 18 or a select one of upright support walls 12 and a select one of cargo items 18. The preferred method includes utilizing the exemplary embodiments of the space filling units described hereinabove.

For FIGS. 18 through 21, all "a" figures illustrate side views of cargo container 14 while all corresponding "b" figures illustrate top views of cargo container 14. In FIG. 18(*a*), space filling unit 510 is disposed between cargo items 18. In FIG. 18(*b*), another space filling unit 510 is interposed between and abuts one cargo item 18 and a select upright support wall 12. In FIG. 19(*a*), cargo items 18 are located medially above cargo container 14 while stacked space filling units 510 are interposed between and abut upright support walls 12 and cargo items 18. In FIG. 19(*b*), another space filling unit 510 is interposed between and abuts cargo item 18 and a select upright support wall 12. In FIGS. 20(*a*) and 20(*b*), a single space filling unit 510 is interposed between and abuts cargo item 18 and upright support wall 12 while a plurality of space filling units 510 are interposed on the other side of cargo item 18 and an opposing upright support wall 12. Note that a plurality of space filling units 510 are arranged in two columns and two rows and appropriately separated from each other by auxiliary panels 254 respectively positioned in both the horizontal and vertical planes. In FIGS. 21(a) and 21(b), a plurality of space filling units 510 are interposed between and abuts cargo items 18 and between upright support walls 12 and cargo items 18. Two of space filling units 510 are stacked one upon another with an auxiliary panel 254 disposed in a horizontal plane therebetween and two other space filling units are disposed in an end-to-end relationship to each other with an auxiliary panel 254 disposed in a vertical plane therebetween. Another auxiliary panel 254 is disposed in a vertical plane between a plurality of space filling units 510 and a single space filling unit 510.

From the foregoing, one of ordinary skill in the art would appreciate that the preferred method of packing cargo 18 in a cargo container 14. The first step of packing cargo 18 in cargo container 14 includes placing cargo 18 on floor 16 of cargo container 14 in a desired location. The second step is filling the first empty cargo space located between cargo 18 and upright support walls 12 of cargo container 14 with at least one space filling unit 10. It is preferred that this method include a third step of filling second empty cargo space located between and interspersed among cargo 18 with at least one space filling unit 10 whereby first and second ends 36 and 38 respectively of each space filling unit 10 filling the second empty cargo space are operative to abut adjacent ones of cargo 18 thereby retaining space filling units 10 and cargo 18 in a stationary position when transporting cargo container 14.

The space filling unit of the present invention which is interposed between either cargo items or cargo and upright support walls of the cargo container inhibits movement of the cargo towards the upright support wall when transporting the cargo container. Additionally, the space filling unit of the present invention is sufficiently versatile in that it can be constructed into a variety of sizes so that it can fit into various sizes of empty cargo space. The space filling unit of the present invention can also be adjusted in its working state to accommodate various widths of cargo containers. The space filling unit is inexpensive, lightweight and portable. Yet, it provides high compressive strength to withstand compressive forces imposed upon it by the cargo and can distribute these compressive forces to either adjacent cargo or the upright support walls of the cargo container and cargo. The space filling unit is also adjustable in height and, therefore, not only does the present invention inhibit movement of the cargo about the floor of the cargo container but it also inhibits tipping of the cargo if the cargo is stacked high. Furthermore, the space filling unit of the present invention can occupy a significant amount of empty cargo space when in its working state without adding significant weight to the cargo load. The space filling structure is easily folded or disassembled for compactness during storage. Thus, a minimum amount of volume is occupied when the space filling unit is in its stow state.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A space filling unit adapted to be interposed between an upright support wall of a cargo container that has a floor and cargo placed on the floor in the cargo container to inhibit movement of the cargo toward the upright support wall when transporting the cargo container, comprising:

a first panel member and a second panel member connected to said first panel member along a longitudinally extending vertex, each of said first and second panel members fabricated from a cardboard material having a plurality of corrugations extending parallel with said vertex, said first and second panel members each having a base edge disposed opposite said vertex and sized and adapted to be positioned on and supported by the floor of the cargo container, said first panel member having oppositely-disposed parallel first side edges and said second panel member having oppositely-disposed parallel second side edges, associated ones of said first side edges and said second side edges forming a first end and a second end operative to abut respective ones of the upright support wall and the cargo to inhibit movement of the cargo towards the upright support wall when transporting the cargo container.

2. A space filling unit according to claim 1 wherein said first and second panel members are hingedly connected to each other along said vertex so that said first and second panel members can move relative to each other to form an inverted V-shaped structure.

3. A space filling unit according to claim 2 wherein said first and second panel members are formed of a unitary construction and scored across a width to define a hinge.

4. A space filling unit according to claim 1 wherein each of said first and second panel members extends beyond said vertex and terminates in an upper edge oriented parallel to said base edges to form an X-shaped structure.

5. A space filling unit according to claim 4 wherein said upper edges are sized and adapted to be positioned on and supported by a pair of upright opposing sidewalls extending perpendicularly from the upright support wall of the cargo container.

6. A space filling unit according to claim 4 wherein each of said first and second panel members include a slot, each slot extending from one of said side edges thereof toward said opposite side edge and operative to receive each other so that said first and second panel members can releasably engage to form said X-shaped structure.

7. A space filling unit according to claim 6 wherein each of said slots are located medially between said base edge and said upper edge of respective ones of said first and second panel members.

8. A space filling unit according to claim 1 wherein said first and second panel members are of substantially common size and shape.

9. A space filling unit according to claim 1 including a plurality of first panel members and a plurality of second panel members hingedly interconnected together to form an accordion-shaped structure.

10. A space filling unit according to claim 1 wherein said space filling unit has a unit height in a range of 50% and 90% of a cargo height of the cargo abutting said space filling unit.

11. A space filling system adapted to be used when shipping cargo, comprising:

(a) a cargo transport structure including a cargo container operative to receive cargo, said cargo container having a floor and a plurality of upright support walls extending from said floor to define a cargo space so that the cargo can be placed on the floor in said cargo container; and (b) a space filling unit operative to be interposed between said cargo and a select one of the upright support walls of said cargo container, said space filling unit having a first panel member and a second panel member hingedly connected to said first panel member along a longitudinally extending vertex, each of said first and second panel members fabricated from a cardboard material and having a base edge disposed opposite said vertex and sized and adapted to be positioned on and supported by said floor of said cargo container, said first panel member having oppositely-disposed parallel first side edges and said second panel member having oppositely-disposed parallel second side edges, associated ones of said first side edges and said second side edges forming a first end and a second end operative to abut respective ones of said select upright support wall and said cargo to inhibit movement of said cargo towards said select upright support wall when transporting said cargo transport structure, said first and second panel members formed of a unitary construction and scored across a width to define a hinge so that said first and second panel members can move relative to each other to form an inverted V-shaped structure whereby said first and second panel members are separatable up to a distance equal to separation of opposed ones of said plurality of upright support walls.

12. A space filling system according to claim 11 wherein each of said first and second panel members extends beyond said vertex and terminate in an upper edge oriented parallel to said base edges to form an X-shaped structure, said upper edges operative to be positioned on and supported by respective ones of a pair of upright opposing sidewalls extending perpendicularly from said select upright support wall of said cargo container.

13. A space filling system according to claim 12 wherein each of said first and second panel members include a slot, each slot located medially between said base edge and said upper edge of respective ones of said first and second panel members and extending from one of said side edges toward said opposite side edge and operative to receive each other so that said first and second panel members can releasably engage to form said X-shaped structure.

14. A space filling system according to claim 11 wherein said first and second panel members are of substantially common size and shape.

15. A space filling system according to claim 11 including a plurality of first panel members and a plurality of second panel members hingedly interconnected together to form an accordion-shaped structure.

16. A space filling structure adapted to be interposed between an upright support wall of a cargo container that has a floor and cargo placed on the floor in the cargo container to inhibit movement of the cargo toward the support wall when transporting the cargo container, comprising:

(a) at least one auxiliary panel having a first auxiliary panel surface and an opposite second auxiliary panel surface extending parallel to said first auxiliary panel surface; and (b) a plurality of space filling units, each space filling unit including a first panel member and a second panel member connected to said first panel member along a longitudinally extending vertex, each of said first and second panel members having a base edge disposed opposite said vertex and sized and adapted to be positioned on and supported by one of the floor of the cargo container and said auxiliary panel, said first panel member having oppositely-disposed parallel first side edges and said second panel member having oppositely-disposed parallel second side edges, associated ones of said first side edges and said second side edges forming a first end and a second end whereby, when said plurality of space filling units are stacked upon one another with at least one auxiliary panel disposed in a horizontal plane therebetween, said first and second ends of each space filling unit are operative to abut respective ones of the upright support wall and the cargo to inhibit movement of the cargo towards the upright support wall when transporting the cargo container.

17. A space filling system according to claim 16 wherein said first and second panel members are formed of a unitary construction and scored across a width to define a hinge so that said first and second panel members are operative to form an inverted V-shaped structure.

18. A space filling system according to claim 16 wherein each of said first and second panel members extends beyond said vertex and terminate in an upper edge oriented parallel to said base edges to form an X-shaped structure, said upper edges operative to be positioned on and supported by respective one of a pair of upright opposing sidewalls extending perpendicularly from the upright support wall of the cargo container.

19. A space filling system according to claim 18 wherein each of said first and second panel members include a slot, each slot located medially between said base edge and said upper edge of respective ones of said first and second panel members and extending from one of said side edges toward said opposite side edge and operative to receive each other so that said first and second panel members can releasably engage to form said X-shaped structure.

20. A space filling structure according to claim 16 wherein said auxiliary panel has a first auxiliary panel end and a second auxiliary panel end extending parallel to said first auxiliary panel end and spaced apart from each other so that said first and second auxiliary panel ends are operative to abut respective ones of the upright support wall and the cargo to inhibit movement of the cargo towards the upright support wall when transporting the cargo container.

21. A space filling structure adapted to be interposed between an upright support wall of a cargo container that has a floor and cargo placed on the floor in the cargo container to inhibit movement of the cargo toward the support wall when transporting the cargo container, comprising:

(a) a plurality of space filling units, each space filling unit including a first panel member and a second panel member connected to said first panel member along a longitudinally extending vertex, each of said first and second panel members fabricated from a cardboard material having a plurality of corrugations extending parallel with said vertex, said first and second panel members each having a base edge disposed opposite said vertex and operative to be positioned on and supported by the floor of the cargo container, said first panel member having oppositely-disposed parallel first side edges and said second panel member having oppositely-disposed parallel second side edges, associated ones of said first side edges and said second side edges forming a first end and a second end; and (b) an auxiliary panel having a first auxiliary panel surface and an opposite second auxiliary panel surface extending parallel to said first auxiliary panel surface, said auxiliary panel operative to be disposed in a vertical plane between two space filling units positioned in an end-to-end relationship and interposed between respective ones of the upright support wall and the cargo so that said first ends of each space filling unit abut respective first and second auxiliary panel surfaces and said second ends of each space filling unit abut respective ones of the upright support wall and the cargo to inhibit movement of the cargo towards the upright support wall when transporting the cargo container.

22. A space filling structure according to claim 21 wherein said auxiliary panel has a first auxiliary panel end and a second auxiliary panel end extending parallel to said first auxiliary panel end and spaced apart from each other so that one of said first and second auxiliary panel ends is operative to abut the floor of the cargo container.

23. A method of packing cargo in a cargo container having a plurality of upright walls extending from a floor to define a cargo space, comprising the steps of:

(a) placing the cargo on the floor of the cargo container in a desired location; and (b) filling first empty cargo space located between cargo and the upright support walls of the cargo container with at least one space filling unit having a first panel member and a second panel member hingedly connected to said first panel member along a longitudinally extending vertex, each of said first and second panel members fabricated from a cardboard material and being of substantially common size and shape, each of said first and second panel members fabricated from a cardboard material having a plurality of corrugations extending parallel with said vertex, said first and second panel members each having a base edge disposed opposite said vertex and sized and adapted to be positioned on and supported by the floor of the cargo container, said first panel member having oppositely-disposed parallel first side edges and said second panel member having oppositely-disposed parallel second side edges, associated ones of said first side edges and said second side edges forming a first end and a second end operative to abut respective ones of the select upright support wall and the cargo to inhibit movement of the cargo towards the select upright support wall when transporting the cargo container.

24. A method according to claim 23, further comprising the step of filling second empty cargo space located between and interspersed among the cargo with at least one said space filling unit.

25. A method according to claim 24 wherein said first and second ends of each of said space filling units filling second empty cargo space located between and interspersed among the cargo are operative to abut adjacent ones of said cargo thereby retaining said space filling units and the cargo in a stationary position when transporting the cargo container.

\* \* \* \* \*